United States Patent
Bourhis et al.

[11] Patent Number: 6,022,585
[45] Date of Patent: Feb. 8, 2000

[54] METHOD OF COATING AN OPTICAL FIBER

[75] Inventors: Jean-François Bourhis, Taverny; Max Matau, Villeneuve la Garenne, both of France

[73] Assignee: Alcatel, Paris, France

[21] Appl. No.: 09/064,609

[22] Filed: Apr. 23, 1998

[30] Foreign Application Priority Data

Apr. 24, 1997 [FR] France ................................... 97 05069

[51] Int. Cl.$^7$ ........................................................ B05D 5/06
[52] U.S. Cl. .................... 427/163.2; 427/8; 427/407.2; 427/434.6; 427/434.7; 427/443.2; 427/314; 427/512; 427/521
[58] Field of Search ........................... 427/163.2, 8, 314, 427/512, 521, 407.2, 434.6, 434.7, 443.2

[56] References Cited

U.S. PATENT DOCUMENTS 5,536,529  7/1996  Shustack .............................. 427/163.2

FOREIGN PATENT DOCUMENTS

0314174A1  5/1989  European Pat. Off. .
0619275A2  10/1994  European Pat. Off. .
4226344A1  2/1994  Germany .

*Primary Examiner*—Janyce Bell
*Attorney, Agent, or Firm*—Sughrue, Mion, Zinn, Macpeak & Seas, PLLC

[57] ABSTRACT

The invention relates to a method of coating an optical fiber, the method comprising the following steps: applying a polymerizable coating material to the surface of the optical fiber; and polymerizing said material to obtain a coating. In the method, the optical fiber prior to application of said material is raised to a value T determining the value T' of the temperature at which said material polymerizes.

8 Claims, 3 Drawing Sheets

METHOD OF COATING AN OPTICAL FIBER

The invention relates to a method of coating an optical fiber having at least one coating that is the result of a material being deposited by means of an applicator and then polymerized.

BACKGROUND OF THE INVENTION

Such a method is implemented, in particular, when manufacturing optical fibers that are to form the basic elements of a telecommunications cable.

In a known manner, the optical fiber is manufactured by being drawn from a preform. While drawing is taking place, the fiber is coated in one or more coatings which give it mechanical strength and thus the required optical performance.

In general, the optical fiber is coated in a first or "primary" coating which increases its traction strength and protects it from moisture. A second or "secondary" coating is applied onto the substrate constituted by the fiber plus its primary coating and serves to distribute within the primary coating any compression and bending forces to which the fiber may be subjected.

The ability of fibers to withstand microbending depends mainly on the effectiveness of the secondary coating(s). Sensitivity to microbending is measured by a standardized test corresponding to utilization standards for fibers and for cables containing them.

Improving the ability of an optical fiber to withstand microbending depends both on the thickness and on the Young's modulus of its coating(s), in general obtained from materials which are cured by polymerization produced by ultraviolet radiation. The temperature at which polymerization takes place determines the Young's modulus of such coatings.

In European patent application EP-0 314 174, proposals are made to guarantee Young's modulus lies within a satisfactory range by controlling the temperature of an enclosure in which the coating is polymerized. The fiber on which the material has been deposited passes through the enclosure where it is exposed to a halogen lamp whose spectrum contains ultraviolet rays and infrared rays.

The ultraviolet rays cause the material to polymerize. Under the action of the infrared rays, the temperature inside the enclosure rises and under steady conditions it reaches about 400° C. in the vicinity of the halogen lamp and about 200° C. in the vicinity of the fiber.

Since the mean polymerization temperature of the material used in that patent application, and also of most UV-cured resins is about 100° C., provision is made to cool the enclosure.

To this end, a flow of steam mixed with carbon dioxide is applied to absorb the infrared rays and remove the corresponding energy from the enclosure.

Methods of the kind described above can give rise to drawbacks, in particular by requiring complicated temperature control which makes use of a gas flowing through the enclosure.

SUMMARY OF THE INVENTION

The object of the invention is to provide a method of coating an optical fiber having a coating whose polymerization is controlled in a manner that is simple and flexible so as to impart a Young's modulus thereto that is guaranteed to lie in a satisfactory range.

To this end, the present invention provides a method of coating an optical fiber, the method comprising the following steps:

applying a polymerizable coating material to the surface of the optical fiber; and polymerizing the material to obtain a coating;

wherein the temperature of the optical fiber, prior to application of said material, is raised to a value T determining the value T' of the temperature at which the material polymerizes.

More precisely, the present invention also provides a method of coating an optical fiber, the method comprising the following steps:

applying a first polymerizable coating material to the surface of the optical fiber;

polymerizing the first material to obtain a primary coating;

applying a second polymerizable coating material to the surface of the optical fiber coated in the primary coating; and polymerizing the second material to obtain a secondary coating;

wherein the temperature of the optical fiber, prior to application of the second material, is raised to a value T determining the value T' of the temperature at which the second material polymerizes.

More generally, according to the invention, the temperature of the optical fiber before applying any material subsequent to the second material may be raised to a value T determining the value T' of the temperature at which the second material polymerizes.

Experiments have shown that controlling the temperature of the substrate constituted by the optical fiber (possibly coated in one or more coatings) upstream from the enclosure in which polymerization takes place is sufficient to guarantee the Young's modulus of the coating that is to be polymerized, without it being necessary to control the temperature of the enclosure itself in which polymerization takes place, as would appear to be necessary from the teaching of the prior art.

This makes it possible to perform the steps of controlling the temperature of the substrate and of polymerizing the coating in two different locations of apparatus for coating the optical fiber.

In general terms, the invention thus proposes controlling the polymerization temperature of any of the coatings applied to an optical fiber by raising the fiber to the desired temperature prior to applying the material that is to constitute the coating in question, and to do this regardless of whether the fiber has only one coating, or has two coatings, a primary coating and a secondary coating, or whether it has more than two coatings.

The present invention also provides the apparatus for coating an optical fiber, comprising:

an applicator for applying a polymerizable coating material to the surface of the optical fiber; and a polymerization enclosure for polymerizing the material to obtain a coating;

the apparatus further comprising a furnace situated ahead of the applicator to confer to the optical fiber a temperature T determining the temperature T' at which the material polymerizes.

More generally, the invention provides an apparatus for coating an optical fiber, the apparatus comprising n assemblies, where n is an integer greater than or equal to 2, each assembly comprising:

an applicator for applying a polymerizable coating material to the surface of the optical fiber; and a polymerization enclosure for polymerizing the material to obtain a coating;

the apparatus further comprising, for all integers k in the range 2 to n, between the polymerization enclosure of assembly k-1 and the applicator of assembly k, an oven for conferring to the coated optical fiber a temperature T determining the temperature T' at which the material applied by the applicator of assembly k polymerizes.

Compared with a flow of gas passing through an enclosure in which the coating is polymerized, an oven provides the advantage of greatly simplifying the coating apparatus.

A second advantage of the apparatus and of the method of the invention lies in the flexibility with which energy is applied, with the oven transferring any desired quantity of heat to the substrate.

BRIEF DESCRIPTION OF THE DRAWINGS

Other characteristics and advantages of the invention will appear on reading the following description of an embodiment of the invention as shown in the figures, in which.

DETAILED DESCRIPTION OF THE PREFERRED EMBODIMENTS

The method of the invention is intended for manufacturing optical fibers of the kind used in telecommunications cables.

Figure 1:
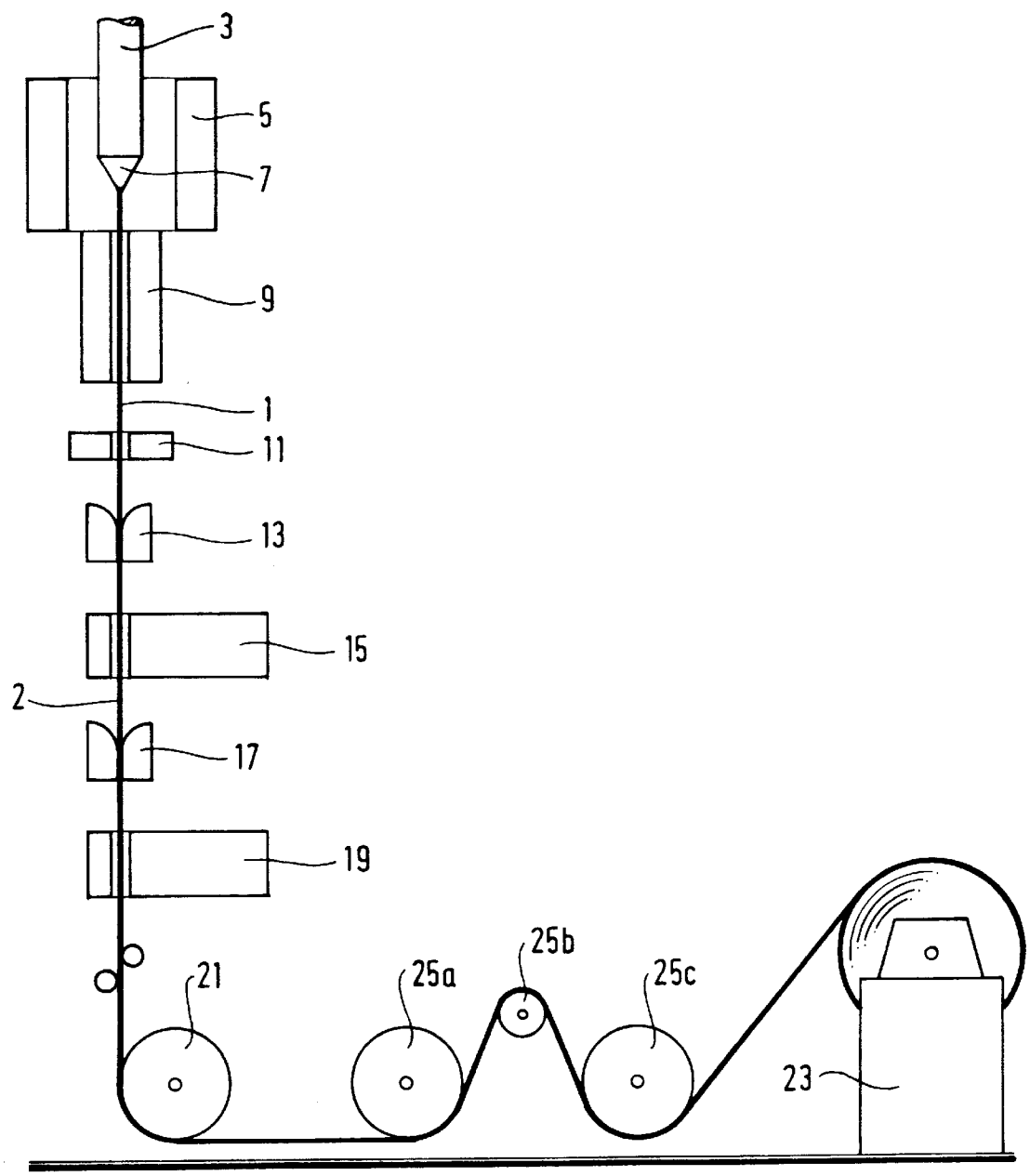
FIG. 1 is a diagram of a prior art apparatus for fiber drawing and coating.

The optical fiber is made from a preform which is softened at one of its ends by a heated enclosure. In FIG. 1, a preform 3 is installed in a heated enclosure 5. An optical fiber 1 is drawn from a fiber-drawing cone 7 and then through a cooling tube 9. An optical device 11 measures the diameter of the fiber where it leaves the cooling tube 9.

During fiber drawing, the fiber is coated with a first or "primary" coating which increases its traction strength and protects it from moisture. A second or "secondary" coating is applied on the substrate constituted by the fiber with its primary coating, and serves to distribute within the primary coating any compression and bending forces.to which the fiber may be subjected.

In FIG. 1. a first applicator 13 deposits a first material on the fiber 1, which material may be constituted, for example, by a polymer resin that is photosensitive to ultraviolet radiation. The resin is polymerized as the optical fiber passes through a first enclosure 15 in which a halogen lamp is installed. A second applicator 17 deposits a second material on the substrate 2 constituted by the optical fiber coated in the first coating. The second material is likewise based on a polymer resin that is photosensitive to ultraviolet radiation. This resin is polymerized as the optical fiber passes through a second enclosure 19 provided with a halogen lamp.

The optical fiber 1 coated with the primary and secondary coatings passes over a capstan 21 and is then wound on a winding machine 23. Pulleys 25a, 25b, and 25c serve to adjust the fiber drawing speed.

Figure 2:
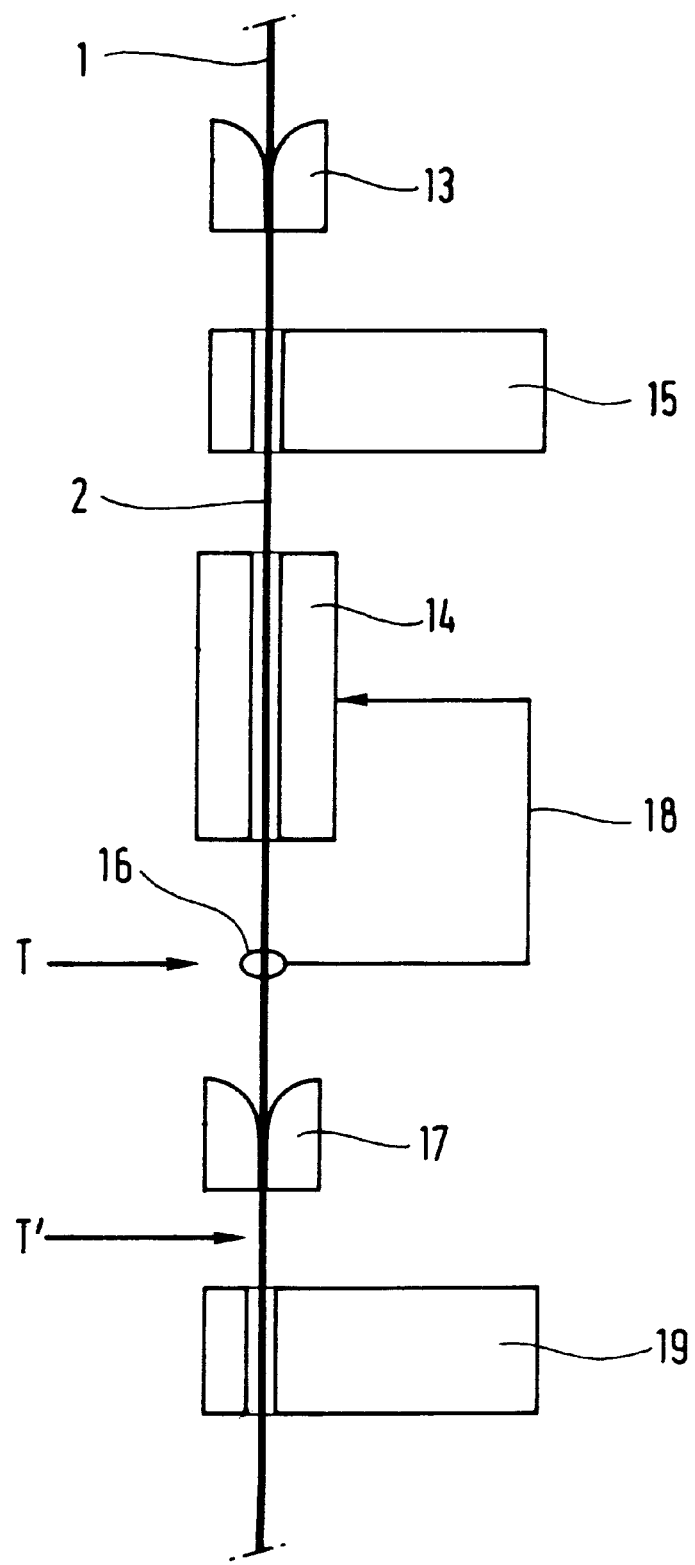
FIG. 2 shows a coating apparatus of the invention.

According to the invention, an oven is placed between the first polymerization enclosure 5 and the second applicator 17. After passing through the oven 14, the substrate acquires a temperature that determines the polymerization temperature of the second material. In FIG. 2, the substrate 2 passes through the oven 14 which imparts a temperature T thereto.

A portion of the heat acquired by the substrate on passing through the oven is released to the surroundings, e.g. to the air in a room where the method is being implemented, and to the material for the second coating as applied by the second applicator, which material is at a lower temperature than the substrate. This heat exchange causes the temperature of the substrate coated in the material for the second coating to decrease slightly. This temperature T' is the temperature at which the material of the secondary coating polymerizes inside the enclosure 19 provided with a halogen lamp.

Since the temperature drop from T to T' is small, the polymerization temperature T' of the second coating is determined by the temperature T acquired by the substrate 2 at the outlet from the furnace 14, lying within a range which corresponds to the desired range for the second coating to have a satisfactory Young's modulus.

In a particular embodiment of the invention, the temperature T of the substrate 2 is measured by a temperature sensor 16 located between the oven 14 and the second applicator 17. The temperature sensor 16 is connected to the oven 16 via an electrical connection 18 to enable the temperature of the oven to be servo-controlled.

This control enables the oven to transfer a sufficient quantity of heat to the substrate to ensure that the polymerization temperature of the secondary coating gives rise to the desired Young's modulus within a range of satisfaction.

The effectiveness of the secondary coating concerning resistance of the optical fiber to microbending depends on the thickness of the coating and on its Young's modulus.

Figure 3:
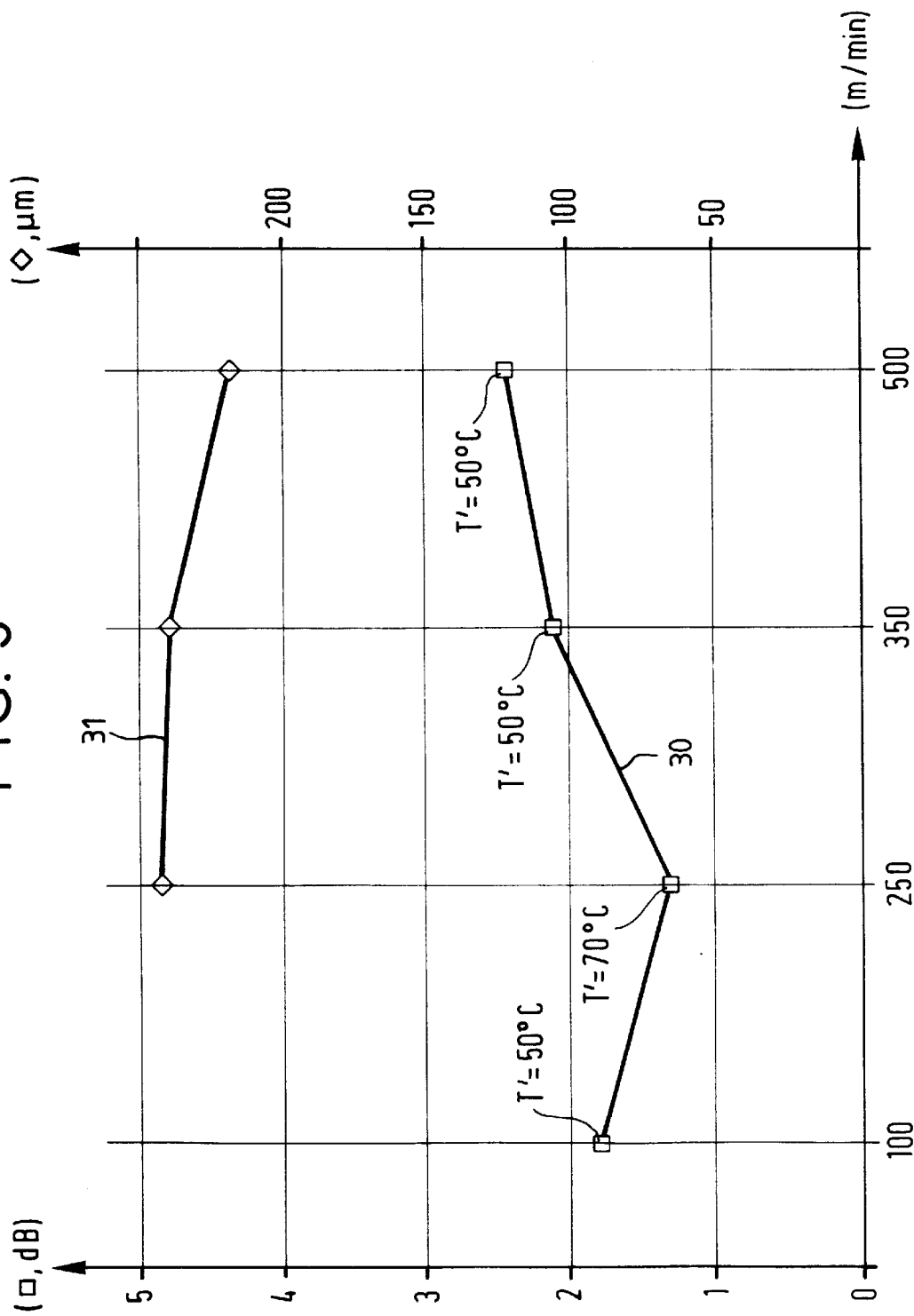
FIG. 3 shows an experimentally-obtained correlation is between resistance to microbending of an optical fiber manufactured in accordance with the invention and fiber drawing speed.

In FIG. 3, curve 30 gives the attenuation measured in decibels (dB) as a.function of fiber drawing speed measured in meters per minute (m/min) for a coated optical fiber obtained without using the apparatus of the invention. The attenuation measured is that caused by pinching an optical fiber between two screens. In a standardized test, this attenuation serves to determine the resistance of the optical fiber to microbending: the lower the attenuation, the better the resistance of the fiber to microbending. An estimate of the polymerization temperature T' is given for each of the points of curve 30.

The experimental points show that the fiber drawing speed has an influence on the resistance to microbending via the polymerization temperature T' of the secondary coating. The best resistance to microbending is obtained at a fiber drawing speed of 250 m/min with a polymerization temperature of about 70° C.

This temperature determines an optimum Young's modulus for the secondary coating. Optimizing Young's modulus to a range of fiber drawing speed can be performed simply by the method of the invention, where the oven 14 of FIG. 2 is put into operation to impart a temperature T to the substrate 2 so as to determine a polymerization temperature T' of about 70° C.

The experimental point corresponding to a fiber drawing speed of 500 m/min presents attenuation which is greater than that of the point corresponding to a fiber drawing speed of 350 m/min. Since the polymerization temperature T' of about 50° C. is identical at both points, the difference of attenuation is correlated to a difference in the thickness of the secondary coating measured in micrometers ($\mu$m) and plotted on curve 31 in FIG. 3.

As a result, Young's modulus can be optimized in effective manner at various fiber drawing speeds by maintaining a constant thickness for the secondary coating.

We claim:

1. A method of coating an optical fiber, the method comprising the steps of:

applying a polymerizable coating material to a surface of the optical fiber; and polymerizing said material to obtain a coating;

wherein the temperature of the optical fiber, prior to application of said material, is raised to a value T, and the value T determines a temperature of a value T' at which said material polymerizes, the value T' lying within a range which corresponds to a desired range for a Young's Modulus of said coating.

2. The method of coating an optical fiber according to claim 1, wherein the applying step and said polymerizing step further comprise the steps of:

applying a first polymerizable coating material to the surface of the optical fiber;

polymerizing said first material to obtain a primary coating;

applying a second polymerizable coating material to the surface of the optical fiber coated in said primary coating; and polymerizing said second material to obtain a secondary coating;

wherein the temperature of the optical fiber, prior to application of said second material, is raised to a value T which determines the value T' of the temperature at which said second material polymerizes.

3. The method of coating an optical fiber according to claim 2, wherein the temperature of the optical fiber before applying any material subsequent to said second material is raised to a value T which determines the value T' of the temperature at which said second material polymerizes.

4. The method of coating an optical fiber according to claim 1, wherein the polymerizing step is performed by exposing the polymerizable material to ultraviolet radiation.

5. An apparatus for coating an optical fiber, the apparatus comprising:

an applicator for applying a polymerizable coating material to a surface of the optical fiber;

a polymerization enclosure for polymerizing said material to obtain a coating;

a furnace situated upstream of said applicator to confer to the optical fiber a temperature T, the value T which determines a temperature of a value T' at which said material polymerizes, the value T' lying within a range which corresponds to a desired range for a Young's Modulus of said coating.

6. The apparatus for coating an optical fiber according to claim 5, wherein the applicator and the polymerization enclosure further comprise:

a first applicator for applying a first polymerizable coating material to the surface of the optical fiber;

a first polymerization enclosure for polymerizing said first material to obtain a primary coating;

a second applicator for applying a second polymerizable coating material to the surface of the optical fiber coated in said primary coating; and a second polymerization enclosure for polymerizing said second material to obtain a secondary coating;

wherein said furnace is an oven situated between the first polymerization enclosure and the second applicator to confer to the optical fiber coated in said primary coating, the temperature T which determines the temperature T' at which said second material polymerizes.

7. The apparatus for coating an optical fiber according to claim 6, the apparatus comprising n assemblies, where n is an integer greater than or equal to 2, each assembly of said assemblies comprising:

an applicator for applying a polymerizable coating material to the surface of the optical fiber; and a polymerization enclosure for polymerizing said material to obtain a coating;

the apparatus further comprising, for all integers k in the range 2 to n, between the polymerization enclosure of an assembly denoted by k-1 and the applicator of an assembly denoted by k, an oven for conferring to the coated optical fiber a temperature T determining the temperature T' at which the material applied by the applicator of the assembly denoted by k polymerizes.

8. The apparatus according to claim 5, wherein a temperature sensor is placed between the oven and the applicator to servo-control the temperature T of the oven.

* * * * *